United States Patent [19]

Tanzer

[11] 3,733,100
[45] May 15, 1973

[54] CONTAINER CARRIER STOCK

[75] Inventor: John Tanzer, Brookfield, Wis.
[73] Assignee: Illinois Tool Works Inc., Chicago, Ill.
[22] Filed: May 5, 1971
[21] Appl. No.: 140,405

[52] U.S. Cl..............................294/87.2, 206/65 C
[51] Int. Cl. ..............................................B65d 71/00
[58] Field of Search..........................294/87.2, 87; 206/65 C, 65 E; 224/45 AB, 45 BA

[56] References Cited
UNITED STATES PATENTS

| | | | |
|---|---|---|---|
| 3,374,028 | 3/1968 | Wanderer | 294/87.2 |
| 3,202,448 | 8/1965 | Stern et al. | 294/87.2 |

Primary Examiner—Evon C. Blunk
Assistant Examiner—Johnny D. Cherry
Attorney—Robert W. Beart, Jack R. Halvorsen, Thomas W. Buckman and Edward L. Benno

[57] ABSTRACT

Strip stock of container carriers primarily for machine application to a selected number of pairs of containers wherein the stock is capable of being severed at any longitudinal position between container encircling bands to provide unitary packages of different selected numbers of pairs of containers.

2 Claims, 3 Drawing Figures

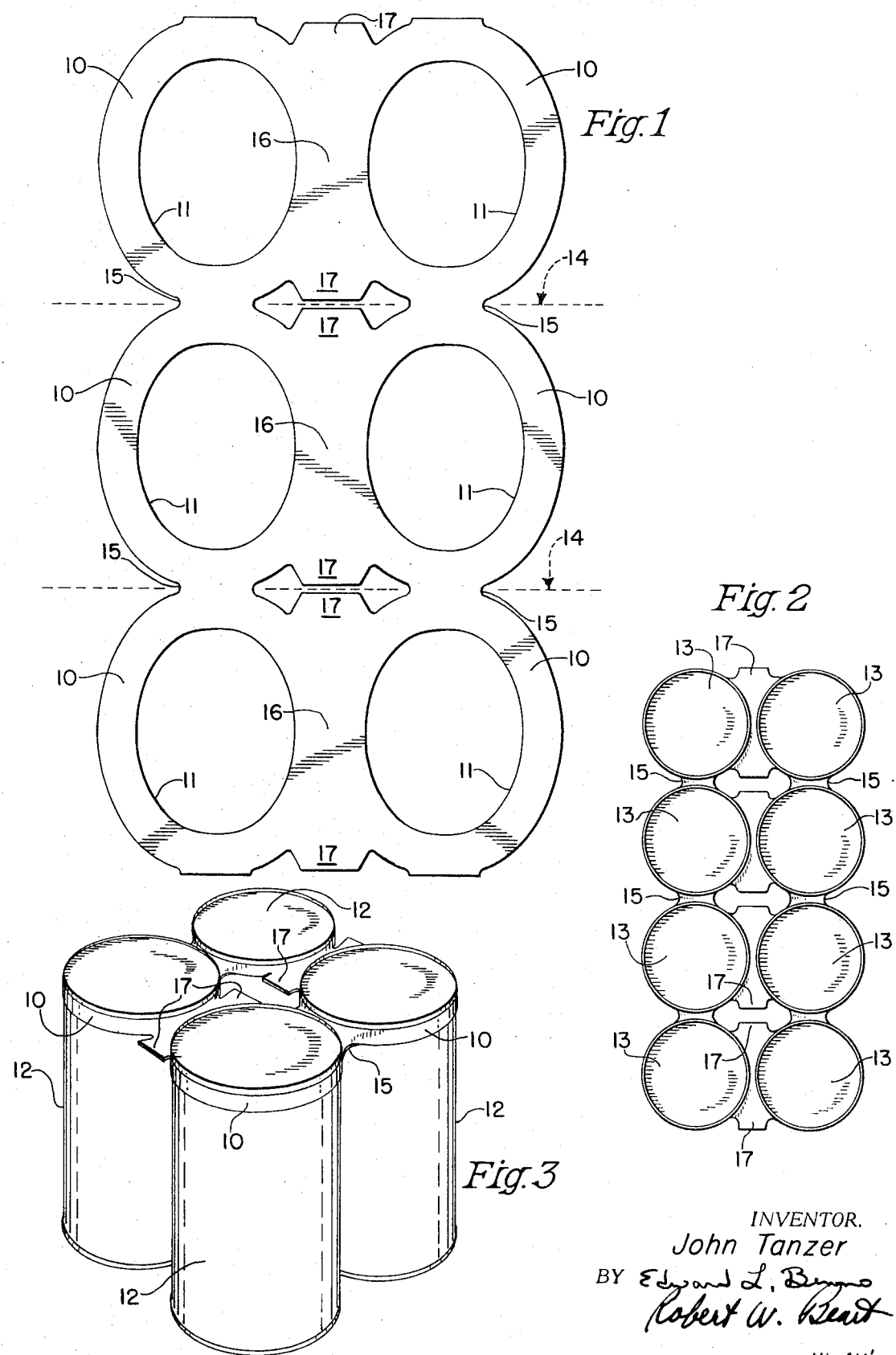

CONTAINER CARRIER STOCK

SUMMARY OF THE INVENTION

This invention concerns a strip stock of container carriers, primarily for machine application to different selected numbers of containers, wherein the stock is formed from a strip of resilient, elastic, deformable, plastic material of substantially uniform thickness. The plastic material contemplated is a polymer such as polyethylene. The strip stock comprises a predetermined length of longitudinally-arranged transverse-pairs of container encircling bands. The strip stock is so formed that it may be severed between any transverse pair of container encircling bands with uniform longitudinal spacing between any plurality of pairs of bands, with a minimum of excess material at the severed ends, with a convenient tab or price tag at the severed ends, and with convenient finger holes and tabs within any group of two or more transverse pairs of container encircling bands.

The subject invention is an improvement in carrier constructions of the type shown in U.S. Pat. No. 2,874,835. Such carriers when formed of the noted material are provided with container encircling bands the continuous inner peripheral extent of which is smaller than the circumferential dimension of the containers. When the carrier is applied to a plurality of containers, the material of the bands adjacent the inner periphery of the bands is disposed substantially flat against the circumferential surface of the containers and firmly grip the containers. The configuration of the bands about the containers at the areas where the bands are interconnected may be described as somewhat frusto-conical.

In the formation of prior art carriers for application to a plurality of containers, the carriers are often formed as continuous strips for machine application. However, in order to provide for proper end configuration of the carriers and a relatively close spacing between the containers in any one carrier, it has heretofore been necessary to provide a different longitudinal spacing between the carrier ends in the strip stock as opposed to the spacing between adjacent transverse pairs of container receiving apertures in any one carrier. Attempts to provide uniform spacing between carriers in a strip stock have generally produced unsatisfactory end configurations for the intended purposes of the carriers.

A further disadvantage resulting from the use of strip stock with other than uniform longitudinal spacing between the container receiving apertures or bands is that it has not been possible to provide carriers of a varied number of container receiving apertures or bands from the same strip stock.

The primary object of the present invention is to provide a strip stock of container carriers which will allow for severance at any longitudinal position between transverse pairs of container apertures or bands, with a minimum of excess material at the severed ends, and with convenient finger holes and tabs within any group of two or more transverse pairs of container encircling bands for comfortably carrying the resulting unitary package of containers and carrier.

A feature of the invention is the formation of a tab or price tag at each end of a carrier severed from the strip stock wherein the tab arrangement is essentially one-half of the finger hole and tabs provided within any group of two or more transverse pairs of container encircling bands.

Other objects and features of the invention will be apparent upon the perusal of the hereinafter following specification and drawing.

BRIEF DESCRIPTION OF THE DRAWING

FIG. 1 is a plan view of a portion of one embodiment of the invention;

FIG. 2 is a top plan view of eight containers in a longitudinal section of the strip stock which is partially shown in FIG. 1; and FIG. 3 is a perspective view of a section of the strip stock of the subject invention applied to four containers or cans.

DETAILED DESCRIPTION OF THE PREFERRED EMBODIMENT

It is contemplated that the strip stock of the subject invention be formed of a considerable length, for example, a thousand or more pairs of bands and usually mounted on a reel. Only one small section of such a strip stock is shown in FIG. 1, but is should be understood that many more bands would be integrally formed on the ends of the section shown.

The section of strip stock shown in FIG. 1 comprises three pairs of integrally formed bands 10. The material of the strip stock is intended to be a resilient, elastic, deformable, plastic material of substantially uniform thickness. Contemplated plastic materials are polymers, such as polyethylene.

The inner periphery 11 of each band 10 is continuous and uninterrupted and defines a container receiving aperture. The defined aperture is substantially elliptical in shape, and the inner peripheral extent of each aperture is less than the circumferential dimension of the containers with which the carrier is intended to cooperate. In the machine application of such carriers to a plurality of containers, the substantially continuous strip stock is brought into association with a plurality of containers, such as cans, and the bands 10 are stretched to slip the bands over the tops of and about the circumferential surface the container. The strip stock is then released and due to the noted characteristics of the plastic material, the bands 10 will assume a more or less flat condition and firmly grip each container. The manner in which the container encircling bands 10 are shaped after application to the containers is substantially shown in FIG. 3 wherein the bands 10 are disposed about a plurality of cans 12. The next step in the process is generally a severing operation to produce groups of unitary packages of a carrier and a plurality of containers. In the strip stock of the present invention that severing operation may occur between any transverse pair of bands 10 to form a unitary carrier and container package of any selected number of pairs of containers. In FIG. 2, the severing has occurred to produce a unitary package of the carrier and the eight cans 13. In FIG. 3, the severing has occurred to produce a unitary package of a carrier and four containers 12. The severing operation to produce the unitary packages is performed along a line such as the dotted lines 14 indicated in FIG. 1.

The material between each band 10 and the next longitudinally positioned band 10 is a relatively short integral web 15 spanning the outer peripheral edge of each band 10 on each side of parallel tangent lines of the adjacent bands 10.

The material between the bands 10 of each pair is an integral longitudinally extending web indicated at 16. The webs 16 extend outwardly of the outer periphery of the bands 10 to form the tabs 17. The tabs 17 terminate short of the severance lines 14. When the tabs 17 are located at either end of a carrier severed from the strip stock, the tabs 17 form convenient legend areas and may be used to indicate the price of the unitary package of a carrier and a plurality of containers. When the tabs 17 are located within a group of two transverse pairs of containers, a convenient finger hole and tabs arrangement is formed for carrying the unitary package. The finger hole and tabs arrangements between the various pairs of bands may also be used for receiving and interlocking with other handle means (not shown). In the unitary package of a carrier of the subject invention and a group of containers as shown in FIGS. 2 and 3, the tabs 17 will be positioned substantially in a plane perpendicular to the axes of the containers, and the integral portions of the bands 10 and webs 15 and 16 will assume a somewhat frustoconical shape.

I claim:

1. A predetermined length of strip stock for forming a plurality of container carriers for different selected numbers of pairs of containers, said strip stock comprising a resilient, elastic, deformable and elongated strip of plastic material comprising a plurality of six or more container encircling bands arranged in a connected series of adjacently positioned pairs, each of said container encircling bands of substantially uniform width throughout a substantial portion of each of their circumferences, first web means extending transversely of said elongated strip and substantially tangentially interconnecting adjacent longitudinally arranged pairs of bands, said pairs of bands being uniformly spaced for selective severance through any selected first web means, second web means longitudinally extending and interconnecting said adjacently positioned pairs of bands, each end of said second web means providing a longitudinally projecting tab extending toward a line transversely of said strip stock and passing through each of said first web means, said tabs extending substantially longitudinally outwardly of the contiguous edges of each of said bands whereby a longitudinally deflectable tab is provided at each end of a strip produced by a selective severance of said first web means and a pair of opposed tabs are provided intermediate each pair of adjacently positioned pair of bands which is connected to a second pair of longitudinally adjacent bands when connected by said first web means.

2. A predetermined length of strip stock as defined in claim 1, wherein the inner peripheral measurement of each of said container encircling bands is less than the circumferential measurement of the corresponding containers so that the material of said bands adjacent the inner periphery of said bands is stretched and deformed to resiliently grip said containers in a substantially flat condition against the circumferential surface of said containers when said bans encircle said containers, and the tabs of said second web means having a length so that said tabs extend in a plane substantially perpendicular to the axes of any containers encircled by said bands when said bands encircle said containers.

* * * * *